Nov. 15, 1949  G. RATTRAY  2,488,239
PANORAMIC TELESCOPE
Filed May 17, 1946  5 Sheets-Sheet 1
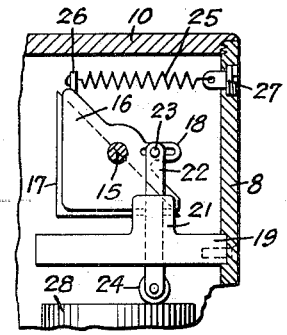
Fig. 1A.
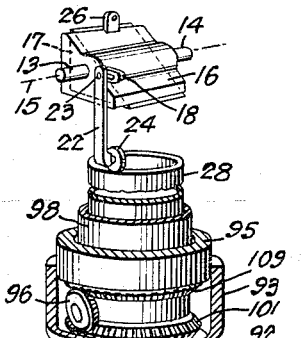
Fig. 2.
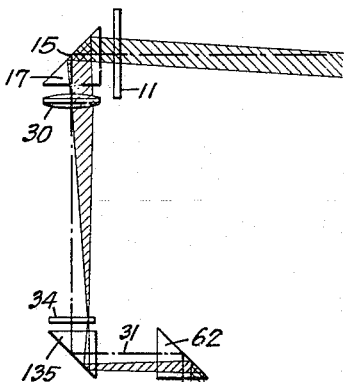
Fig. 1.
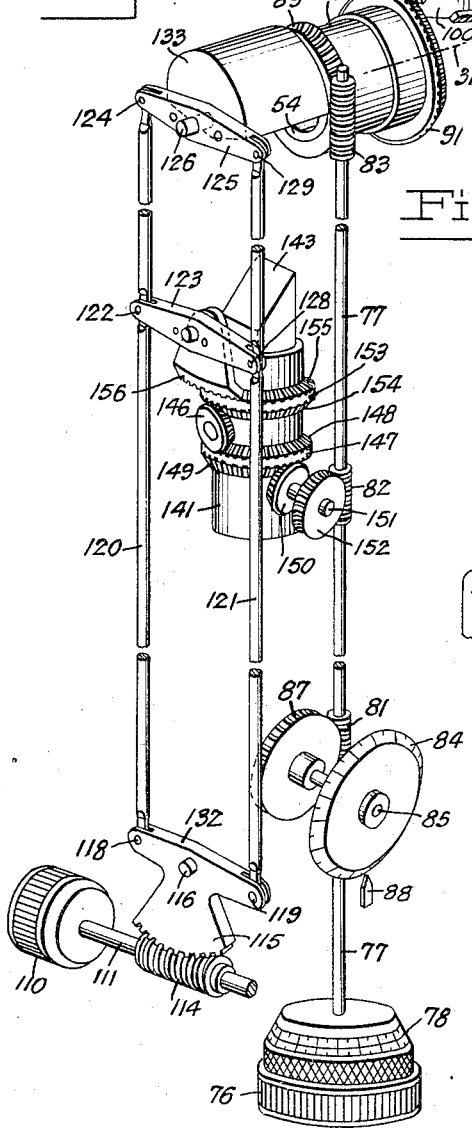
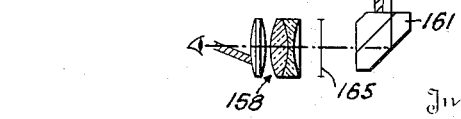
Fig. 9.
Inventor
George Rattray
By J. H. Church + H. E. Thibodeau
Attorneys

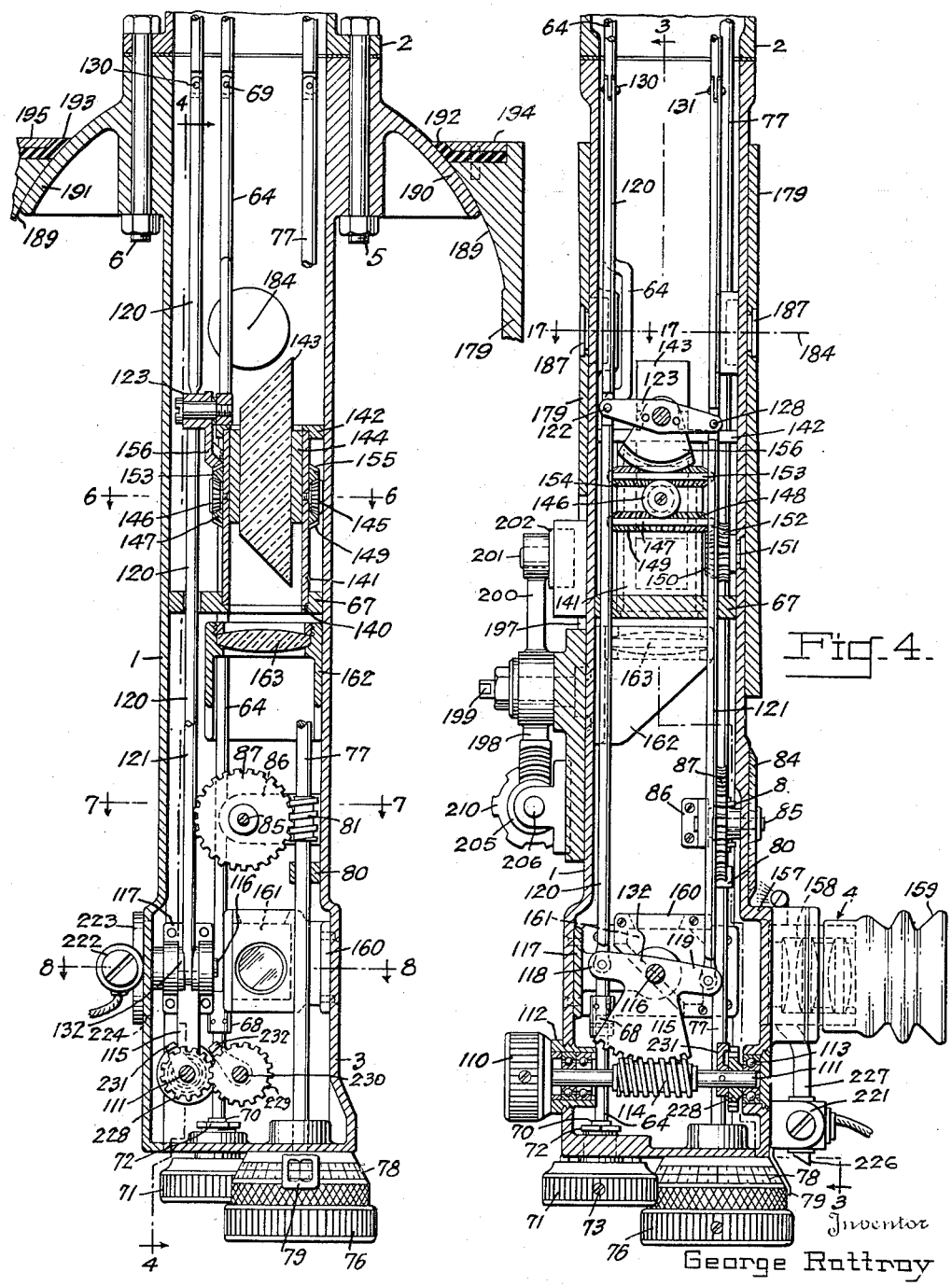

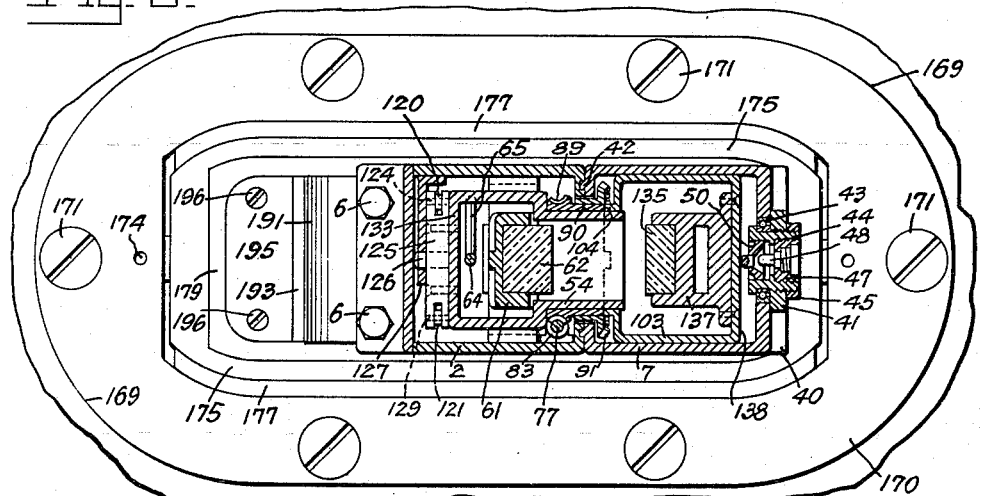
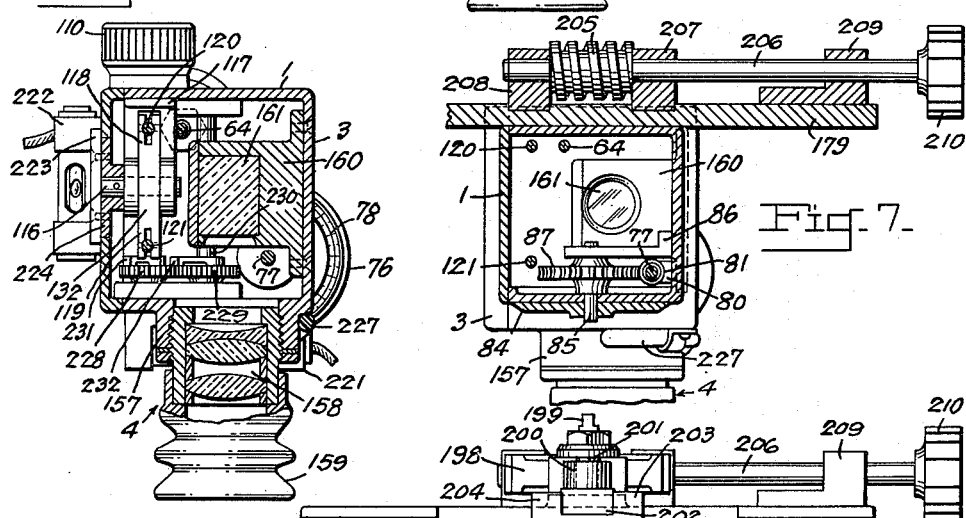
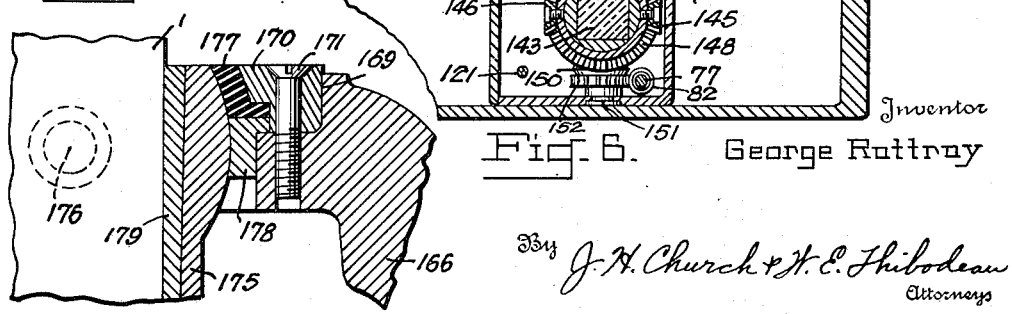

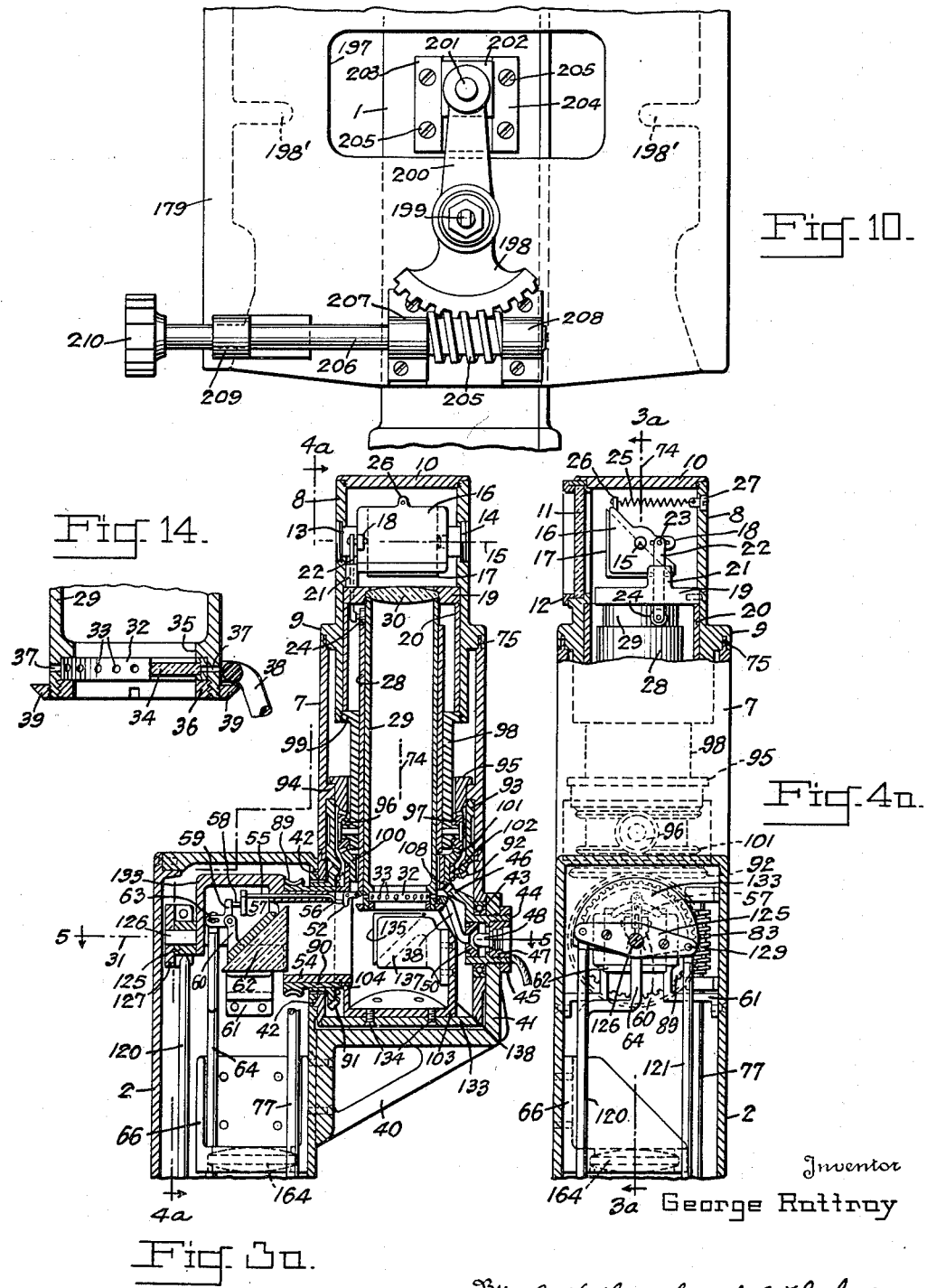

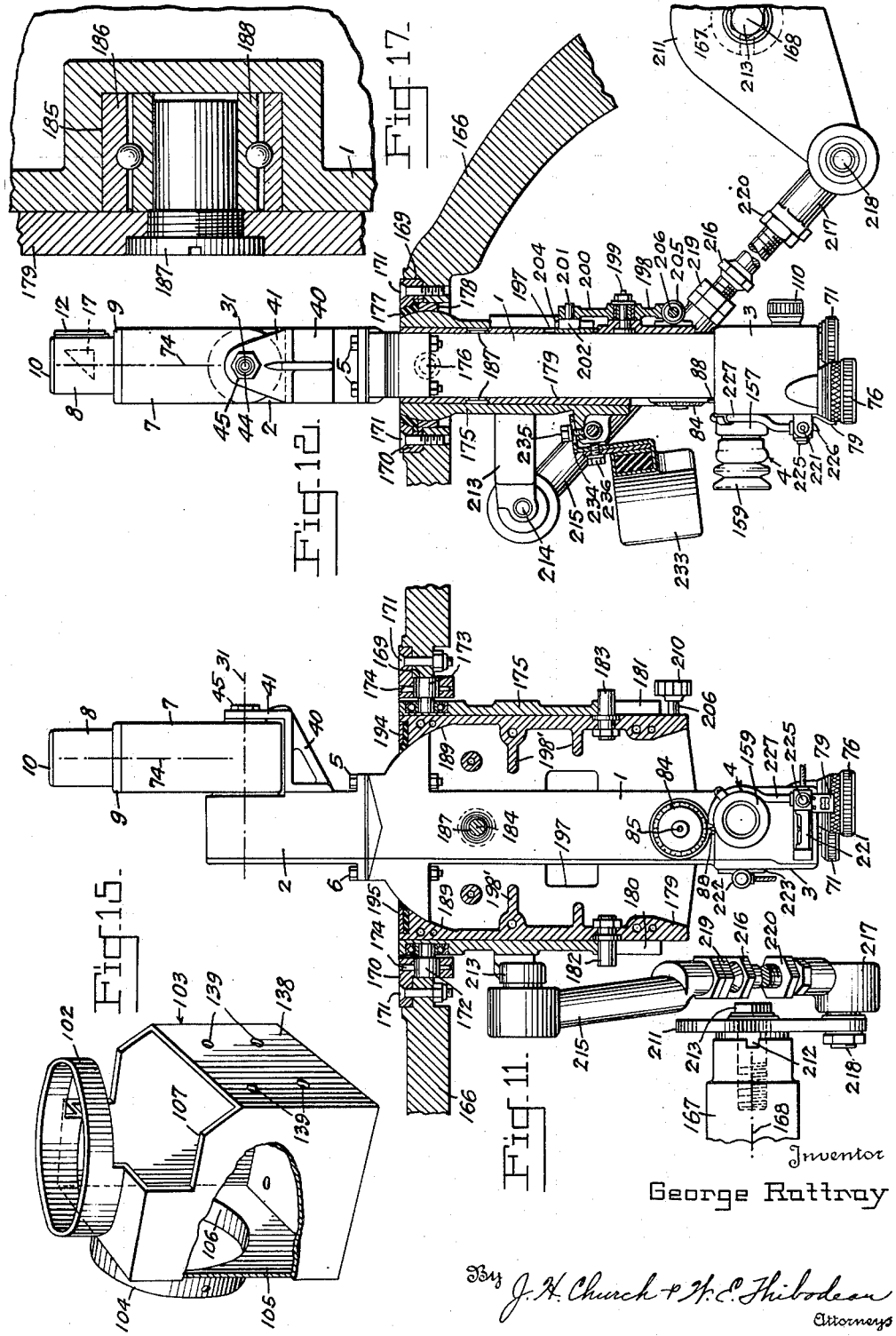

Patented Nov. 15, 1949

2,488,239

UNITED STATES PATENT OFFICE 2,488,239

PANORAMIC TELESCOPE

George Rattray, Mineola, N. Y., assignor to Mergenthaler Linotype Company, a corporation of New York Application May 17, 1946, Serial No. 670,575

10 Claims. (Cl. 88—72)

This invention relates to panoramic sights intended particularly for use in aiming the turret guns of tanks or similar vehicles.

One object is to provide a panoramic sight which may be inserted in one or more standard mounts from a position within the turret.

Another object is to provide a panoramic sight that is effective throughout 360° of azimuth and in which azimuth and elevational measurements of the angles of rotation of the line of sight thereof are made about truly vertical and horizontal axes.

A further object is to provide a rugged hinge joint connecting two sections of the sight for relative rotation about a normally horizontal axis and providing for accurate transmission of elevational and azimuthal movements of the line of sight past said joint in the form of rotational movements about said axis.

A still further object is to provide a telescope having relatively offset upper and lower sections connected by a hinge joint, together with adjusting means passing through said joint internally of the telescope whereby the upper section may be pivoted about said joint from a position at the lower end of the lower section to change the elevation of the line of sight of said telescope.

Another object is to provide a panoramic telescope as in the preceding paragraph, wherein the upper section has top and bottom parts, the top part being rotatable relatively to the bottom part, to move the line of sight in azimuth.

Yet another object is to provide a panoramic telescope having its tube in two offset sections connected by a hinge joint of rugged construction and wherein parts of the objective section are adjustable by mechanical connections that extend internally of said telescope concentric of the axis of the hinge joint and wherein adjustments of the line of sight about two mutually normal axes may be effected by an observer at the lower end of the lower section.

A still further object is to provide a panoramic telescope having a first entrance reflector and second and third reflectors deflecting the line of sight from the first reflector along the hinge joint then along the lower tube section, the first prism being adjustable to move the line of sight about one axis and the first and second reflectors being movable as a unit relatively to the third, to move the line of sight about a second axis normal to said first axis.

Another object is to provide a telescope as outlined in the immediately preceding paragraph, wherein the relative angular movements of the reflectors as described is compensated by a single optical part or dove prism.

A still further object is to provide a panoramic telescope having upper and lower sections hinged on a normally horizontal axis, wherein the telescope is mounted in a member for synchronous movement in elevation with the gun about a second axis parallel to the first-named axis and for cross-leveling about an axis parallel to the gun bore.

Yet another object is to provide a telescope of the type shown wherein one section may be operated from a position adjacent the remote end of the other section by means of parts one of which carries a bubble tube level whereby a vertical position of the upper section may be indicated at a point remote therefrom.

Another object is to provide a system of optical parts for periscopic telescopes having its line of sight angularly adjustable in two mutually perpendicular planes by means of a set of relatively rotatable reflectors together with a single optical element operable automatically to maintain erect the field of view of the periscope for all angular positions of the line of sight.

Other objects and advantages will be apparent as the description proceeds.

In the drawings—

Figure 1 is a diagrammatic view showing the optical elements of the sight and the path of a typical light beam therethrough.

Figure 2 is a skeletonized perspective view partly in section, showing the mechanical linkages by which the desired motion is transmitted from the operating knobs to the several optical elements.

Figure 3 is a sectional view of the lower portion of the sight within the vehicle, and taken on line 3—3, Figure 4.

Figure 3a is a sectional view taken upon the line 3a—3a of Figure 4a, and showing the external or objective portions of the panoramic telescope.

Figure 4 is a sectional view of the lower portion of the sight and taken upon planes indicated by the line 4—4, Figure 3.

Figure 4a is a view partly in section and taken upon the line 4a—4a, Figure 3a, the top portion of the upper tube section being broken away to show the entrance prism and its mounting.

Figure 5 is a section taken upon the line 5—5, Figure 3a and showing details of the fore and aft leveling hinge joint and the mounting of the upper pair of prisms.

Figure 6 is a section taken upon the line 6—6, Figure 3, and showing the dove prism and the mount therefor, as well as portions of the cross-leveling mechanism.

Figure 7 is a section taken upon the line 7—7, Figure 3, and showing the mechanism for operating the coarse azimuth scale as well as portions of the cross-leveling mechanism.

Figure 8 is a section upon the line 8—8, Figure 3, showing the ocular, the lower prism mount, and the lower actuating lever for the line of sight elevation mechanism.

Figure 9 is a detail perspective view showing the construction for transmitting tilting motion to the objective prism, past the fore and aft leveling hinge joint.

Figure 10 is an elevational view showing the cross-leveling connection between the mount and the telescope.

Figure 11 is a view partly in section showing the telescope mount, the telescope therein and the link connection between the mount and the gun trunnion.

Figure 12 is a view partly in section similar to Figure 11, but taken in a plane at right angles to the plane of Figure 11 and showing further details of the telescope mount and cross-leveling connections.

Figure 13 is an enlarged detail view of the means for tilting the upper or entrance prism.

Figure 14 is an enlarged detail view of the reticle and its mounting.

Figure 15 is a perspective view of the box and prism support, one side thereof being partly broken away more clearly to show its construction.

Figure 16 is a detail cross-section of a portion of the telescope mount, and

Figure 17 is a cross-section taken upon the line 17—17 of Figure 4, showing in detail one of the cross-leveling pivots between the telescope and adapter.

The telescope tubes include a lower tube section formed of a lower part 1 and an upper part 2, both generally square in cross section. As best shown at Figures 3 and 11, the two parts 1 and 2 are flanged at their meeting faces, and through-bolts 5 and 6 act to rigidly unite the parts in alignment. The upper tube section is also formed of two parts, a lower part 7 and an upper part 8 of somewhat smaller transverse dimension than part 7 and having an external flange 9 adapted to be secured over, and to close, the upper end of part 7. Part 7 is generally square in cross-section and 8 is closed at its upper end by a flanged cap 10 threaded to engage internal threads of part 8. These parts are relatively rotatable about vertical axis 74, as will be hereinafter described.

Part 8 has an objective opening closed by a flat pane 11 of transparent material, mounted within a frame 12. Part 8 has pivot elements 13 and 14 threaded into diametrically opposite apertures therein. Each element has a reduced end or stud and the studs are aligned to define a pivot axis 15 (see Figs. 3a and 4a), normally horizontal and parallel to pane 11. The frame 16 of a 45° total reflecting entrance or objective prism 17 has aligned apertures receiving the aforesaid reduced ends of elements 13 and 14, whereby the prism is journaled for pivotal movement on axis 15 lying in the plane of its reflecting surface.

At one side, frame 16 has a projection 18 having therein, a normally horizontal slot extending radially of axis 15. A ring 19 is held by a sleeve 20 against an internal circumferential shoulder within part 8. This ring has an eccentric axially-extending projection 21 apertured to provide an axial guideway for a push rod 22. A pin 23 is secured to the upper end of rod 22 and extends into the slot in projection 18, to have a smooth sliding fit therein. The lower end of rod 22 extends below ring 19, where it carries an antifriction roller 24. As shown at Figure 4a, a tension spring 25 is attached to one end to a lug 26 fixed to frame 16 and at the other end to an adjusting screw 27, threaded into an aperture in the wall of part 8. The spring thus acts to urge prism 17 into clockwise rotation as seen in Figure 4a, and to urge rod 22 downwardly so that its roller 24 engages the end of a sleeve 28.

The aforesaid sleeve 28 has a smooth sliding fit on and exteriorly of a second sleeve 29. An objective lens 30 fits within the central threaded opening in ring 19, and is held against the shoulder within said opening, by sleeve 29 which has its upper end threaded into said opening. Sleeve 29 extends downwardly so that its lower end is just above the axis 31 of the hinge joint between the aforesaid parts 2 and 7. At its lower end sleeve 29 carries a reticle which, as shown in Fig. 14, may comprise a metallic bezel 32 having radial light-transmitting apertures 33 and mounting a flat pane 34 of transparent material having the usual cross hairs scribed thereon. Bezel 32 is retained against a shoulder formed by an internal flange 35 in sleeve 29, by a ring 36 threaded into the end of the sleeve. Radial apertures are formed in the sleeve, each in alignment with a respective aperture 33, so that light transmitted by a rod 38 which may be of methyl methacrylate from a source subsequently described, passes into the pane 34 to illuminate the reticle lines thereon. A support for the arcuate end of rod 39 is provided by a ring 39 threaded on tube 29.

The axis 31 of the hinge joint between the relatively offset upper and lower tube sections or, more specifically, between parts 2 and 7, has been identified. This axis is substantially parallel to the trunnion axis of the gun or other device which the sight is intended to aim. Relative pivotal movement between the sections, about this axis, is afforded by a rugged hinge joint including a bracket 40 attached to the flat face of upper part 2, and having an upstanding portion 41 provided with a threaded hole concentric of axis 31.

The lower end of part 7 fits between the aforesaid portion 41 and the confronting face of part 2. At the confronting faces the parts are guided for relative pivotal movement about axis 31, by an interengaging flange and groove 42, Figure 3a, concentric of said axis. At its side adjacent portion 41, part 7 carries an anti-friction bearing 43 whose inner race is journalled upon a sleeve 44 threaded into the hole in portion 41 and locked in position by nut 45. As best shown at Fig. 2, sleeve 44 has an integral bevel gear sector 46 concentric of axis 31 and for a purpose subsequently described. The end of sleeve 44 is closed by a plug 47 forming a receptacle for an incandescent bulb 48. An end of plastic rod 38 is mounted adjacent bulb 48 by a dished washer 50 having a pressed fit within sleeve 44. As this end lies in axis 31 the rod 38 pivots in washer 50 as a unit with part 7.

It has been shown that movement of prism 17 about its elevation axis 15, is produced by axial translation of sleeve 28. Such axial translation is effected by a linkage including parts which are operative to produce the desired motion irrespective of the angular relation of the upper and lower tube sections about axis 31 and which are unaffected by relative angular motion of the sections about said axis. As best shown at Fig. 9, sleeve 28 has a lug 51 attached to its lower end and to which is pivoted one end of a small bell crank 52 pivoted by pin 53 within an axially-extending slot formed in the end portion of a composite bracket and bushing or sleeve 54. Spring 25 acts through sleeve 28 against the adjacent end of a push rod 55, mounted for sliding within a bore in bushing 54 parallel to axis 31, and held against rotation therein by the offset or bent portion 56 in cooperation with the slot within which bell crank 52 is pivoted.

The other end of rod 55 has an arcuate flange 57 fixed thereto. This flange is generally concentric of axis 31 and has its forward face in a plane normal to said axis. Through the action of spring 25, this face is held in contact, with a pin 58 fixed in one arm of a second bell crank 59 which is pivoted between the arms of a bracket 60, secured to the carrying frame 61 of a prism 62. The remaining arm of bell crank 59 is bifurcated and has its ends radially slotted to receive a pin 63, fixed in the upper end of a push rod 64. This rod is bent to form an offset 65 following which it extends downwardly adjacent one side wall of the lower tube section comprising parts 1 and 2 as may be seen at Figs. 6 and 7. The rod is suitably guided for vertical translation only, as by passing through apertures in a lens bracket, Fig. 3a, a retainer ring 67, Fig. 3, and has a pivot joint 69, also shown at Fig. 3. The rod is formed in two sections, connected by a coupling 68 and terminates just above the lower wall of tube section 1 where it is urged by the downward thrust applied by spring 25 (Figs. 4a and 13), into a socket formed in the end of an adjusting screw 70. This screw is threaded through a bushing 72 which in turn is threaded through an aperture in a thickened portion of the lower tube wall. A knob 71 is secured, as by set screw 73, to the end of screw 70 externally of the section casing. Suitable conventional spring detent means are provided between the knob and adjacent section wall. By the construction just described, rotation of knob 71, in conjunction with the thrust applied by spring 25, acts to translate rod 64 and, through the connections shown at Fig. 9, to pivot prism 17 about its axis 15. As the two telescope sections pivot relatively, about axis 31, pin 58 rides in an arcuate path over and along flange 57, without affecting the pivotal adjustment of prism 17. Furthermore, a given adjustment of knob 71 will always effect the same rotation of the prism, no matter what the position of pin 58 relatively to flange 57. This adjustment is provided to keep the aiming point in the field of view of the telescope.

As previously stated upper tube part 8, carrying prism 17, is rotatable relatively to part 7 by reason of flange 9, the circular channel therein fitting over a reduced flange on the upper end of part 7, as shown at 75, Figs. 3a and 4a. Part 8 is rotated about axis 74 by mechanism that includes a knob 76 fixed to the projecting lower end of a shaft 77. This knob carries an azimuth or gunner's scale 78 coacting with an indicator 79 to indicate the azimuthal adjustment of part 8, prism 17, and the line of sight. Shaft 77 is journaled at its lower end in a bearing provided by the lower wall of chamber 3 and extends upwardly in and along one corner of the lower tube section through a bearing 80, Fig. 4. As best seen at Fig. 2 shaft 77 has fixed thereon worms 81, 82 and 83. Worm 81 is provided to drive a coarse azimuth scale 84 mounted for convenient inspection by an observer at the telescope ocular 158. This scale comprises a disc having a chamfered graduated rim fixed to a shaft 85 journaled at one end in a bearing provided by the wall of part 1 and a spaced bracket 86 at the other end as shown in Fig. 4. A worm gear 87 fixed to shaft 85, meshes with worm 81 so that the rotations of knob 76 and disc 84 are proportional. The disc is preferably graduated in 64 divisions of 100 mils each, and is read in conjunction with a pointer 88, Fig. 2, secured to the tube wall. The purpose and function of worm 82, will be subsequently explained.

Worm 83, at the upper end of shaft 77, meshes with a worm gear 89 formed on one end of a sleeve 90 rotatable on bushing 54. This sleeve is, of course, concentric of axis 31. At its end opposite gear 89, sleeve 90 has a bevel gear ring 91 fixed thereto. The teeth of this gear are in mesh with those of a second bevel gear 92 formed upon the lower end of a sleeve 93. As best shown at Fig. 3a, tube part 7 has an internal flange 94. Sleeve 93 is held in rotatable contact with the lower shoulder of this flange by threaded engagement with a flanged collar 95 rotatably contacting the upper shoulder of flange 94. Sleeve 93 and collar 95 are thus rotatable as a unit about axis 74 and are held by flange 94 against displacement along said axis. The lower edge of collar 95 is formed with gear teeth comprising one sun gear or side of a compensating or "take-out" differential. The planetary pinions 96 and 97 of this differential, are journaled on studs fixed in a sleeve 98 for rotation on axes extending radially of axis 74. Sleeve 98 is, of course, concentric of axis 74, and has a threaded flange 99 at its upper end engaging a threaded counterbore in the lower end of tube 8. From Fig. 3a, it will be noted that this flange engages the lower end of sleeve 20 to hold ring 19 in position against the shoulder of tube 8. Sleeve 98 and pinions 96 and 97 thus form a second side of the aforesaid differential.

A ring 100 is mounted concentric of axis 74, and has a bevel gear 101 formed upon its upper end, in mesh with pinions 96 and 97. The ring 100 fits within and is supported by the upper circular flange portion 102 (see Fig. 15), of an element 103 generally in the form of a cubical box and prism support. Part of the circumference of flange 102 is secured to the edge of an arcuate opening in the top of the box and is tangent to the plane of one side face 105 of said box. The aforesaid side face has a circular opening 106 tangent to the plane of the top surface of the box. A flange 104 is secured to the edge of opening 106. As shown at Fig. 3a, the end of this flange abuts against and in effect forms a continuation of, sleeve 90. The right upper corner of the box as viewed in Fig. 15, is cut away along lines indicated at 107, to avoid interference with rod 38 and gear sector 46.

Gear sector 46 has previously been described as fixed to portion 41 of bracket 40 which, in turn, is fixed to upper part 2 of the lower tube section. The teeth of this sector are beveled, concentric of axis 31, and in mesh with a gear sector 108 whose teeth are concentric of axis 74. Sector 108 is fixed to ring 100 in any suitable manner. In Fig. 3a, the connection is shown as an upward projection fitting between sleeve 29 and ring 100, within a notch or cut-away portion of sleeve 28.

When azimuth knob 76 is turned, shaft 77 and worm 83 are correspondingly turned, to rotate gears 89 and 91. Rotation of gear 91 drives bevel gear 92 and its sleeve 93. At this time, sector 46, being fixed to bracket 40, acts to lock gear sector 108 which, as previously described, is fixed to sun gear 101. Gear 101 is thereby fixed at this time against rotation. Since the teeth 109 on collar 95 as well as those of gear 101, are in mesh with planetary pinions 96 and 97, rotation of sleeve 95 as a unit with sleeve 93, causes the aforesaid pinions to roll around gear 101 and effect a rotation of sleeve 98 about axis 74. Rotation of sleeve 98, in turn, carries with it, part 8, ring 19, sleeves 20 and 29, lens 30 and prism 17 to thereby rotate the line of sight in azimuth by an angle indicated precisely by indicators 79 and 88.

In the absence of the differential including gears 101, 109 and pinions 96, 97, rotation of the upper tube section comprising of parts 7, 8 about axis 31, relatively to the lower tube section comprising parts 1, 2, would also cause azimuthal rotation of the line of sight. This is because gear 91, being fixed at this time, gear 92 would roll around gear 91 and cause azimuthal rotation of the line of sight in addition to elevational rotation thereof. The aforesaid differential acts to eliminate this error because, while gear 92 is thus rolling around gear 91, sector 108 is rolling around sector 46 by an equal angular amount. Hence gears 101 and 109 are rotated equally and oppositely to thereby hold the axes of pinions 96 and 97, as well as sleeve 98 and prism 17, fixed against azimuthal rotation.

Rotation of the upper tube section comprising parts 7, 8 about axis 31, relatively to the lower tube section comprising parts 1, 2, is effected by turning of knob 110, conveniently located adjacent azimuth knob 76, and fixed to a shaft 111. This shaft is journaled within antifriction bearings carried by bushings 112 and 113 threaded into apertures at respectively opposite sides of the walls of chamber 3 as clearly shown upon Figure 4. A worm 114 is fixed to shaft 111 and meshes with a gear sector 115. This sector is fixed on a shaft 116, Fig. 8, pivoted on the arms of a bracket 117 fixed to the inner wall of chamber 3. The sector is formed with a lever 132 having oppositely-extending arms 118 and 119 each bifurcated as clearly shown upon Fig. 2. The total angle of rotation of shaft 111, is limited by mechanism including a pinion 228 fixed to said shaft and in mesh with a larger pinion 229, Fig. 3, pivoted on a jack shaft 230. Shafts 111 and 230 have respective stops 231 and 232, which, because of the difference in size of the intermeshing gears 228 and 229 are brought into engagement at limiting positions of movement of sector 115 to thereby positively prevent further movement. A rod 120 has its lower end pivoted within the bifurcated end of arm 118 and extends upwardly along one side wall of the lower tube section, and is pivoted at 122 to one arm of a double-arm lever 123 whose purpose and function will be subsequently described. At its upper end, rod 120 is pivoted at 124 to one arm of a double-arm lever 125, pivoted on axis 31 by a stub shaft 126. Figure 3a, shows this shaft as carried by a bracket 127, affixed to the wall of part 2.

A second rod 121 is pivoted at its lower end within the bifurcated end of arm 119 and extends upwardly where it is pivotally connected at 128 with an arm of lever 123 and at 129 with an arm of lever 125. Rods 120 and 121 have pivot joints adjacent the meeting faces of parts 1 and 2, as indicated at 130 and 131, Fig. 4. As clearly shown upon Fig. 2, the effective lengths of rods 120 and 121 are equal as are the effective lengths of the arms of levers 132, 123 and 125 so that the pivot joints therebetween form parallelograms and levers 123 and 125 are rocked in exact synchronism with lever 132 when moved by actuation of knob 110. Precise operation is assured because the motion is always transmitted by tension applied either to rod 120 or to rod 121.

Lever 125 is pinned to the bracket portion 133 of composite bracket and bushing 54, so that the two rotate as a unit about axis 31, as best shown at Figs. 2, 3a, and 5. As previously stated bushing 54 projects into flange 104 of box 103 and is secured to said flange in any convenient manner, as by one or more pins passing through aligned holes in the bushing and flange. Since box 103 is rigidly attached by screws 134 to the lower closure cap 136 of part 7, upper section, said section as a whole is rotated by, and under the precise control of, knob 110 to thus elevate and depress the line of sight determined by prism 17. It will be noted that knob 76, rotates about a substantially vertical axis and effects movement of the line of sight in azimuth, while knob 110 rotating about a substantially horizontal axis, rotates the line of sight in elevation. Furthermore, as the line of sight is moved in the same direction as the direction of rotation of the knobs the adjustments are made in a natural manner that is easily learned and that eliminates vertigo on the part of the observer. As best shown upon Figs. 1, 3a and 5, a right-angled prism 135 is mounted at the lower end of part 7, by a frame 137 attached to the wall 138 of box 103, holes 139, Fig. 15, being provided for this purpose.

Retainer ring 67 fixed within section 1 has been described. As seen in Fig. 3, this ring has a counterbored circular opening forming a shoulder 140 that rotatably supports a sleeve 141. Upward movement of this sleeve is prevented by a second retainer 142 fixed to tube 1 and engaging the upper end of sleeve 141. A dove prism 143 is mounted by member 144 for movement as a unit with sleeve 141. This sleeve has a pair of planet pinions 145 and 146 pivoted thereon at diametrically opposite sides. A lower sun gear 147 rotatably fits about sleeve 141 and has an upper bevel gear 148, in mesh with pinions 145 and 146 and a lower bevel gear 149 in mesh with a bevel pinion 150 as clearly shown upon Fig. 2.

Pinion 150 is fixed on a shaft 151 journaled in the side wall of the lower tube section 1. A worm wheel 152 is fixed on shaft 151 and meshes with worm 82, fixed on shaft 77, as previously described. A second sun element 153 rotatably fits sleeve 141 and has a lower bevel gear 154, Fig. 2, in mesh with planet pinions 145 and 146. A second bevel gear 155 is formed on the upper edge of 153. This gear 155 meshes with a gear sector 156, fixed to lever 123 and having its teeth concentric of the pivot axis of said lever. Elements 147 and 153 are duplicates and their gears 148 and 154 form two sides of a differential whose center is composed of pinions 145 and 146. Thus, in accordance with a well-known principle of the differential, sleeve 141 and prism 143 are rotated through one-half the algebraic sum of the rotations of sun gears 147 and 153. That is, when either of said sun gears is motionless, rotation of the other gear rotates prism 143 through one-half the angle of rotation of the sun gear.

Considering azimuthal rotation only of the line of sight as effected by operation of knob 76, such rotation effects a relative rotation of prisms 17 and 135 and would, unless corrected, cause tilting and ultimate inversion of the field. This tilting is corrected by the half-speed rotation of prism 143 by reason of the drive thereto from shaft 77 through worm 82, and gears 152, 150, 149, 148, 146 and sleeve 141, in the manner well known in optics. Likewise actuation of knob 110 to elevate or depress the line of sight by hinge action between the sections about axis 31, causes a relative rotation between prisms 62 and 135 which, unless corrected, would also cause tilting and ultimate inversion of the field. This tilting is corrected by the half-speed drive to prism 143 by way of lever 123, sector 156, gears 155, 154, 145 and 146, and sleeve 141 in the manner well known in optics. The field at the eye-piece is thus maintained erect for all positions of relative adjustment of the optical elements of the telescope.

One wall of lower chamber 3 is flanged and internally threaded as indicated at 157 (see Fig. 8), to receive an eye-piece assembly 4, of standard construction and fitted with rubber hood or buffer 159. A bracket 160 supporting an Amici prism 161, is secured to the wall of chamber 3, as seen at Figs. 3 and 8. This prism deflects the rays proceeding axially along lower telescope section 1, 2, into the eye-piece 158. In addition to the optical elements previously described, a bracket 162, Figs. 3 and 4, is provided for positioning an objective lens 163 just below prism 143. A second objective lens 164 is supported by bracket 66 adjacent the upper end of part 2, just below prism 62.

The general arrangement of the optical elements is shown at Fig. 1 where it will be noted that the rays pass through entrance pane 11, are deflected 90° downwardly by prism 17 and focused by objective 30 upon reticle pane 34. Thence they are again deflected 90° by prism 135 to pass along the axis of the hinge joint to prism 62, where they are again deflected 90° downwardly along the axis of the lower tube section through objective 164, dove prism 143 and objective 163 to Amici prism 161. Here the rays are again deflected 90° into the eye-piece assembly 158. The focal plane is indicated at 165.

A mounting suitable for adapting the instrument for use in aiming the cannon of a tank, is illustrated at Figs. 5, 10, 11 and 12. In these figures, 166 indicates in cross section a portion of a tank turret having mounted therein a gun, one trunnion of which is indicated at 167, Fig. 11 wherein it will be noted that the sight may conveniently be mounted a little to the right and rear of the gun which, of course, trains as a unit with the turret, while elevating about the trunnion axis 168 with respect to the turret. The top of the turret has a shouldered opening 169 therein of the general contour indicated at Fig. 5. A frame or ring 170 fits within the opening 169 and is secured therein by bolts 171, shown as six in number. Frame 170 has opposite aligned bores therein in which bearing studs 172 and 173 are fixed, as by taper pins 174. The reduced ends of studs 172 and 173 fit within the inner races of a pair of anti-friction bearings whose outer races fit within aligned recesses in a sleeve 175 of generally rectangular configuration in cross section, as seen in Fig. 5. The axis 176, Fig. 12, defined by studs 172 and 173, is parallel to the axis of the gun trunnions and lies substantially in the plane of the top of the turret. The top portion of the sleeve 175 has its outer surface formed as the surface of a cylinder, concentric of axis 176 and, as shown at Fig. 16, the space between this cylindrical surface and frame 170 is filled by upper and lower filler rings 177 and 178, respectively, having mating flanges in a plane through axis 176 and clamped in position between the frame 170 and the shoulder of opening 169. In this manner, the sight is freely pivotal about axis 176 while the space between frame 170 and the telescope is closed for all angular positions of the latter about said axis. The lower end of sleeve 175 has slots 180 and 181, Fig. 11, extending vertically a short distance from the lower edge of its opposite end walls.

An adapter 179 has a sliding fit within sleeve 175 and is provided with aligned oppositely disposed locating pins 182 and 183 projecting outwardly therefrom. These pins are adapted to fit and ride within slots 180 and 181 whereby to positively locate the adapter relatively to its receiving sleeve. The adapter may be held in position within the sleeve by means of one or more spring-pressed pins on sleeve 175 and projecting through holes therein. Said pins may snap into corresponding holes in adapter 179 when the latter is in proper inserted position within sleeve 175, as determined by locating pins 182 and 183. This construction is not shown because it forms no part of my invention.

As shown by Figs. 6 and 7, part 1 of the lower tube section is square in cross-section and has a smooth fit between the inner side walls of adapter 179 so that freedom of movement of the sight within and relatively to the adapter is permitted in a normally vertical plane through the axis 176. A normally horizontal or cross-leveling pivot axis 184 is provided between the adapter and telescope by means of two pivots one of which is shown in detail at Fig. 17. From this figure, in conjunction with Fig. 4, it will be noted that the opposite walls of tube 1 are pressed inwardly to form aligned sockets such as 185 within which the outer race 186 of an anti-friction bearing fits. The adjacent wall of adapter 179 has a threaded opening to receive a headed bearing pin 187 fitting within the inner race 188. These two bearings define the cross-leveling axis 184 and from Fig. 11 it will be noted that this axis is somewhat below axis 176 and within the turret. At its top, adapter 179 is formed inside with surfaces 189 that are portions of a cylinder about axis 184. The adjacent enlarged portion of part 1 is formed with flanges 190 and 191 mating with surfaces 189 and thus having outer surfaces formed as portions of a cylinder with 184 as an axis. From Fig 3, it will be noted that packing sections 192, 193 are held by retainers 194 and 195, in position against the surfaces of flanges 190 and 191 to therewith form a weather-tight slip joint. These retainers are held in position by screws as at 196, Fig. 5. The inner end walls of the adapter are formed with stop members as 198', to limit the rotation of the telescope about its cross-leveling axis.

One side wall of adapter 179 is formed with an opening 197 (see Figs. 6, 10 and 11). A segment gear 198 is pivoted on a stud 199 projecting from the outer wall of the adapter just below opening 197, and has an upwardly extending lever arm 200 having a hole at its upper end that fits over a pin 201 fixed on a block 202. As best shown upon Fig. 10, a pair of lugs 203 and 204 are fixed to the side wall of part 1 adjacent opening 197, by means of screws 205. These lugs project through opening 197 and define a vertical guideway within and along which block 202 is slidable. Pivotal movement of segment gear 198 is effected by a worm 205 meshing therewith and fixed on a shaft 206 between bearings 207 and 208 journaling said shaft. A third bearing for the shaft is provided on the adapter wall at 209 adjacent a knob 210. By the construction just described, rotation of knob 210, which is convenient to an observer at eye-piece 159, effects rotation of segment 198 and acts through lever 200 to cause the telescope to pivot about its cross-level axis 184. Since axis 184 is maintained parallel to the bore axis of the gun, by means subsequently described, cross-leveling to bring tube 1 parallel to a vertical plane through the axis of the gun bore, effects a displacement between the aforesaid plane and the vertical plane through the line of sight, in the manner well known in the art of gunnery. The aforesaid displacement is, then, the azimuth error otherwise caused by the tilted or inclined trunnion axis so that, when gun and sight are trained as a unit to restore the line of sight upon the target, the errors otherwise caused by elevation of the gun about a trunnion axis inclined to the horizontal, are automatically corrected.

One gun trunnion 167 and the trunnion axis 168, Figs. 11 and 12, have previously been identified. The end of the trunnion has a crank arm 211 fixed thereto. As shown, connection may be effected by a mating channel and projection 212 on the trunnion and arm, extending diametrically of axis 168. A cap screw 213 holds the two parts together in a manner obvious from Fig. 11. The sleeve 175 has a rearwardly-extending arm 213' fixed thereto, and carrying a crank pin 214 engaging in a bearing in one end of a link part 215. This link is a composite element adustable in length by means of a screw member 216 having right and left-hand threads, or threads in the same direction of different pitch. This member has one end threaded into part 215 and its other end threaded into a part 217 having a bearing journaling a crank pin 218 fixed in the end of crank arm 211. Lock nuts 219 and 220 maintain the adjustment of part 216 which, in turn, determines the effective distance between the axes of pins 214 and 218.

From Fig. 12 it will be noted that the axes 168 and 176, together with the axes of pins 214 and 218 lie on the corners of a parallelogram such that the distance 176—214 equals the distance 168—218 as measured in the plane of the figure. Also the distances 168—176 and 214—218, are equal. Thus the telescope is pivoted about axis 176, parallel to the gun trunnions in synchronism with elevational movements of the gun. The connection and adjustments are such that cross-leveling axis 184 is at all times parallel to the axis of the gun bore. Hence cross-leveling adjustments effected by operation of knob 210 always take place about an axis parallel to the gun bore.

As well shown upon Figs. 4, 8, 11 and 12, a pair of bubble-tube levels are carried by mutually normal walls of chamber 3 in position for convenient observation by the operator at ocular 4. The cross-level is indicated at 221 immediately below ocular 4. The elevation level 222 (see Figs. 3 and 8) is mounted upon a plate 223 that is fixed to a circular member 224 rotatably mounted in a circular opening in the adjacent wall of chamber 3 concentric of shaft 116 and fixed to said shaft. Since sector 115 and lever 132 are also fixed to this shaft, the level 222 rotates as a unit with shaft 116 in the fore-and-aft leveling effected by knob 110, and in synchronism with the angular adjustment of upper tube section comprising parts 7, 8, about the hinge axis 31. Level 222 is thus operative to indicate when the aforesaid section 7, 8, has been brought into a vertical plane through axis 31. The level 221 is illuminated by a small incandescent lamp enclosed in one end of its casing, as indicated at 225, Fig. 11. A short section of methyl methacrylate rod 226 conducts light from lamp 225 downwardly to illuminate indicator 79. Another length of methyl methacrylate rod 227 extends upwardly from lamp 225 about flange 158 and terminates adjacent pointer 88 to thereby illuminate the portion of scale 84 adjacent said pointer. Level 222 is illuminated by a lamp enclosed in one end of its housing and fed by current supplied over a cable leading thereto. Lamp 225 may be similarly energized from the same source of current.

A headrest 233 of soft rubber, is shown at Fig. 12. This is shaped to fit about the forehead of an observer at ocular 4 and is adjustably mounted upon a right-angled bracket 234 carried by a projection formed upon the lower end of sleeve 175. As clearly shown, the generally horizontal arm of bracket 234 is slotted and held in position by a screw 235 so that headrest 233 may be adjusted forwardly and rearwardly then held in such position by turning down the screw. The generally vertical arm of bracket 234 is attached to headrest 233 by a screw 236 whereby the rest may be adjusted about a generally horizontal axis.

Figures 11 and 12 show the position of the sight when the gun is in horizontal or point blank position with its trunnion axis horizontal, the line of sight horizontal and parallel to the bore axis of the gun, and all indicators at zero. When a visible target is selected for engagement by the tank commander, and its range and the angle of gun elevation necessary to engage the target, have been determined, the gun is elevated to the determined angle for that range. This movement acts through the parallelogram linkage 211, 215 and 213', to tilt the telescope about axis 176, thus elevating the line of sight by the angle of gun elevation. The observer at ocular 4, operates knob 110 to pivot the upper tube section comprising parts 7, 8 relatively to the lower tube section, about axis 31 until the bubble of level is centered, at which time, upper section comprising parts 7, 8 has been returned to a vertical position. The turret gun and sight are then trained as a unit until the target is picked up in the line of sight. Cross level 221 is now observed and if the bubble is not centered because of tilt or cant in the trunnion axis, knob 210 is actuated in the proper direction to effect centralization of the bubble of level 221.

Since axis 184 is now elevated to the angle of gun elevation, the foregoing cross-leveling by knob 110, causes the line of sight to traverse the surface of a cone whose axis is axis 184 and whose apex angle is twice the angle of gun elevation. The line of sight is thus depressed and deflected in azimuth equally and oppositely to the angular error caused by elevating the gun about a tilted trunnion axis. In order to restore the line of sight to the target, the gun and sight must now be given an additional movement in elevation, as well as deflection in azimuth. Then, when the line of sight is again directed upon the target, the gun is properly laid and proper correction for tilt has been introduced. While the adjustments have been described separately, for clarity of explanation, they may take place substantially simultaneously and, as soon as the gun is elevated to the indicated angle of quadrant elevation, levels 221 and 222 are centered, and the line of sight is upon the target, the gun is known to be properly laid. In short, when properly adjusted, the axis 31 of the telescope is truly horizontal and the axis 74 of the upper telescope section, is truly vertical. Since turning of knob 76 adjusts the line of sight in azimuth by rotating part 8 relatively to part 7, about a truly vertical axis, the indications at indicators 79 and 88, are true azimuth angles and may be used to measure the horizontal angle at the gun subtended by any two remote points or targets, as when a new target is to be picked up. When the two points are at slightly different elevations, the line of sight may be changed in elevation as required, by actuation of knob 71, without changing the angle of gun elevation. The sight is thus usable to scan the horizon or to rotate its line of sight through 360° of azimuth while elevated or depressed relatively to the horizon at any angle within the limits of adjustment of the instrument. It may be used to determine the true azimuth or train angle necessary to change from one target to another as well as to accurately lay the gun to successfully engage a target within range, whether visible or invisible.

When an invisible target is to be engaged, its range and azimuth at the gun, from a visible aiming point or stake are determined. The gun is elevated to the determined angle, the parts are leveled and cross-leveled as previously described, to bring axis 74 to the vertical after the turret, gun and sight are rotated as a unit until the aiming point or stake is in the line of sight. The line of sight is then set off relatively to the vertical plane through the gun bore, by the predetermined azimuth angle and in the direction opposite to the direction of the target from the aiming point. This is done, of course, by actuation of knob 76 in conjunction with scale 78 and indicator 79. The gun, turret, and sight are then trained as a unit until the aiming point is again in the line of sight. Cross leveling, if necessary is effected, and the gun, turret and sight are trained and the gun and sight elevated, to again bring the cross-hairs of the telescope reticle upon the aiming point. The gun is then ready for firing at the invisible target. Other uses will appear or be obvious to those skilled in the art.

I have thus provided a panoramic sight that is of general utility, but particularly adapted for use in laying the guns of tanks. The telescope is rugged in construction, operates with a high degree of precision, is fully enclosed and protected against the entrance of dampness and dust, and has a minimum number of parts positioned exteriorly of the turret. The hinge joint is rugged and not easily damaged by striking against fixed objects such as the branches of trees.

Furthermore, it will be noted that the sight and its adapter 179, may be inserted into place in sleeve 175 and its mount, from a position within the tank turret. Exposure of tank personnel to enemy small arms fire is thus avoided. By providing different adapters, the sight may be mounted in any standard mount and will give results that are equally accurate as when used with a mount shown. The provision of a silica gel or other type of desiccator, preferably connected with the interior of chamber 3, to avoid the condensation of moisture upon the parts of the instrument, is contemplated. With the exception of the lenses 163, 164 and pane 11, all optical parts are now used in other standard ordnance instruments. Repairs and replacements are thereby facilitated. The sight may be used to accommodate the full 47 degrees range of movement in elevation of the present Army M10 periscope mount. The model selected for illustration has an optical field of 8° to 10°, and a magnification of 4.

The term "free end" of either telescope section, as used in the claims, means that end remote from the end hinged to the other section on axis 31. The term "first section" or "lower section" refers in all cases to the section comprising parts 1 and 2.

The term "second section" or "upper section" refers in all cases to the section comprising parts 7 and 8.

While I have shown a preferred form of the invention, numerous alterations, substitutions and modifications will occur to those skilled in this art. It is my intention that the foregoing disclosure shall be taken in an illustrative sense only and I desire to reserve all such changes as fall within the scope of the subjoined claims.

Having now fully disclosed my invention, what I claim and desire to secure by Letters Patent is:

1. In a panoramic telescope, a lower tube section, an upper tube section comprising upper and lower parts relatively rotatable about a common axis of said upper section, hinge means mounting the lower part of said upper section on and in offset relation with said lower section for pivotal movement about a second axis at right angles to the axes of both sections, there being an entrance window at the upper end of said upper part and an ocular at the lower end of said lower section, optical means projecting rays from said entrance window along said upper section and second axis and lower section, in succession, to said ocular, said optical means including first, second and third reflectors, said first and second reflectors being positioned in and along said second axis and in said sections, respectively, whereby said second and third reflectors are relatively rotated in response to rotation of said upper section about said second axis, a dove prism rotatably mounted in said lower section, first and second drives carried by and within said sections and including manually operable parts adjacent said ocular to rotate said upper part and said upper section respectively, to deflect the line of sight in azimuth and elevation, and a connection from both said first and second drives to rotate said dove prism, whereby the field of view is maintained erect for all positions of adjustment of said telescope.

2. In a panoramic telescope for a combat tank, an upper normally vertical tube section comprising upper and lower parts, said upper part being rotatable relatively to said lower part about their common first axis, a lower tube section having a longitudinal second axis, annular pivot means mounting said upper section on the upper end of said lower section for pivotal movement about a third axis normal to and concurrent with both said first and second axes, first and second sleeves extending through and within said pivot means, a first bevel gear on said first sleeve within said upper tube section, a second bevel gear within said upper tube section and concentric of said first and third axes, means securing said second bevel gear to said lower section, a differential having its center carried by said upper part and its sides connected respectively with said first and second bevel gears on opposite sides of said first axis, optical means including a 90° entrance reflector mounted within the upper end of said upper part, said optical means projecting the rays received by said entrance reflector in succession along said first, third and second axes to an ocular at the lower end of said lower tube section, a rigid connection between said second sleeve and lower part, and means operable adjacent said ocular and extending along and within said lower tube section for selectively rotating said first and second sleeves.

3. A panoramic telescope comprising a lower tube section, an upper tube section, means pivoting the adjacent ends of said upper tube section and said lower tube section in offset relation for pivotal movement of said upper section about a first axis normal to the longitudinal axis of each said section, said upper section comprising coaxial upper and lower tubular parts, said upper part being rotatable relatively to said lower part about their common longitudinal axis, an entrance prism pivoted on a normally horizontal axis in the upper end of said upper part and an ocular carried by the lower end of said lower tube section, optical means deflecting rays incident on said prism along said upper section, first axis and lower section, in succession, into said ocular, first means manually operable adjacent said ocular and including a first rod mounted in and extending along said lower tube section and operatively connected to said upper section to pivot said upper section about said first axis and verticalize said upper tube section, and second means manually operable adjacent said ocular and including a second rod mounted in and extending along said lower tube section and operatively connected to said upper part of said upper section to rotate said upper part and thereby to rotate in azimuth the line of sight determined by said prism.

4. A panoramic telescope as recited in claim 3, said first and second means also including interfitting independently rotatable first and second sleeves coaxial of said first axis and extending into and between said tube sections, means rotating said first and second sleeves in response to actuation of said first and second rods, respectively, a rigid connection between said first sleeve and lower part of said upper section, and means operatively connecting said second sleeve with said upper part of said upper section to thereby angularly adjust said upper part and the line of sight in azimuth, in response to rotation of said second sleeve.

5. In a panoramic telescope, upper and lower elongated generally vertical telescope tube sections, pivot means mounting the lower end of said upper section for pivotal movement on and in offset relation with, the upper end of said lower section, about a first axis normal to the longitudinal axes of both said sections, a sleeve secured to said upper section coaxially of said first axis and extending into said lower section, a first double-arm lever pivoted in the lower end of said lower section, a second double-arm lever rigidly secured to said sleeve transversely of said first axis, rods extending within and along said lower section, each said rod having an end connected with a respective end of said levers whereby to connect said levers for pivotal movement in unison, manually operable means on the lower end of said lower section to pivot said first lever and thereby said second lever, sleeve, and upper section about said first axis, a bubble level fixed with said first lever normal to said first axis and the longitudinal axis of said first tube section, an entrance reflector pivoted on a normally horizontal axis in the upper end of said upper section, and directing substantially horizontal rays incident thereon downwardly along said upper section, an ocular carried by the lower end of said lower section, and optical elements in said sections deflecting said rays axially along said sleeve and lower section into said ocular, said level being operative to indicate the vertical position of said upper tube section about said first axis.

6. In a periscopic telescope, first and second tubular telescope sections, a joint connecting adjacent ends of said sections in laterally offset contiguous relation for pivotal movement about a first axis normal to both said sections, said joint including first and second telescoped sleeves coaxial of and rotatable independently about said axis and extending into both said sections, a first bevel gear fixed on said first sleeve in said first section, a second bevel gear rotatable in said first section coaxially thereof and in mesh with said first bevel gear, a connection between said second sleeve and said first section to rotate said first section about said axis relatively to said second section, an entrance reflector, a mount for said reflector mounted on said first section at the end thereof remote from said sleeves and rotatable about the axis of said first section, an eyepiece carried by the end of said second section remote from said joint, optical elements carried by and within said sections to deflect rays incident on said reflector along said sections and first axis into said eyepiece, a differential gearing having one side connected to rotate said reflector mount as aforesaid, a second side rigidly connected for rotation with said second bevel gear, means connecting a third side of said differential for rotation in response to relative rotation of said sections about said first axis, to thereby obviate errors in azimuth otherwise introduced by relative rotation of said sections about said first axis, and means carried by said second section adjacent said eyepiece for individually and selectively rotating said sleeves.

7. In a cross-leveling telescope for a gun mounted for elevation on a trunnion axis within a turret trainable about a normally vertical axis, said telescope comprising lower and upper telescope tube sections, means connecting said sections at their adjacent ends in laterally offset contiguous relation for relative pivotal movement about a first axis normal to the longitudinal axes of both said sections, said first axis being normally parallel with said trunnion axis, a mounting sleeve, means mounting said sleeve for pivotal movement in an opening through the wall of said turret about a second axis parallel to said first axis, tubular adapter means slidably fitting said sleeve and removably mounting lower tube section in said sleeve for pivotal movement about a third axis normal to said first and second axes, said telescope projecting through said turret opening, means adapted to connect said sleeve and gun to pivot the sleeve, adapter and telescope as the gun is elevated, to maintain said third axis parallel with the axis of the gun bore, an ocular carried by the lower end of said lower section, an entrance reflector carried by the upper end of said upper section, optical elements in said sections effective to deflect rays horizontally incident on said reflector along said upper section, first axis and lower section, in succession into said ocular, means carried by said sleeve and operable from a position adjacent said ocular to rotate said telescope in the adapter about a fourth axis parallel with the gun elevation axis, and a bubble tube level mounted on said lower section adjacent said ocular, with its longitudinal axis parallel with said first and second axes.

8. In a panoramic telescope, a lower telescope tube section having a first longitudinal axis, an ocular carried by the lower end of said lower section with its axis at right angles to said longitudinal axis, an upper telescope tube section comprising coaxial upper and lower tubular parts, said upper part being rotatable on and relatively to said lower part about a common longitudinal second axis, an entrance reflector mounted within the upper end of said upper part, pivot means mounting said lower part on the upper end of said lower tube section in offset relation therewith for rotation about a third axis normal to and concurrent with said first and second axes, first and second sleeves coaxial with said third axis each said sleeve having an end extending into a respective tube section, optical elements carried within said sections and operative to project rays incident on said entrance reflector into said ocular, means operable at the lower end of said lower section adjacent said ocular, and extending within and along said lower tube section to rotate said sleeves independently, a rigid connection between said first sleeve and lower part of said upper tube section to rotate said upper tube section about said third axis, and means responsive to rotation of said second sleeve to pivot said upper part and reflector about said second axis relatively to said lower part to thereby adjust in azimuth the line of sight determined by said entrance reflector.

9. A panoramic telescope as recited in claim 8, means mounting said entrance reflector in said upper part for pivot adjustment on a fourth axis parallel with said third axis, a third sleeve mounted within said upper part for translation therealong, means pivoting said entrance reflector about said fourth axis in response to translation of said third sleeve, and means operable adjacent said ocular and including a rod axially slidable in a bore in said first sleeve, to translate said third sleeve and thereby adjust in elevation the line of sight determined by said entrance reflector.

10. In a panoramic telescope, first and second telescope tube sections, means connecting adjacent ends of said tubes in laterally offset relation for relative angular movement about an axis normal to and concurrent with the longitudinal axes of both said tube sections, an entrance reflector pivoted in said first section at the upper end thereof on a second axis, said second axis being normally horizontal and lying in the reflecting surface of said reflector, an ocular carried by the lower end of said second tube section, optical elements in said sections reflecting rays from said entrance reflector in and along said sections to said ocular, a mechanical linkage carried by said sections for pivoting said reflector about said second axis, said linkage including a part translatable along and parallel to said first axis within said sections and terminating at its end within said second section, in a plane surface normal to and generally arcuate about said first axis, a bellcrank pivoted adjacent said surface and having one arm bearing thereagainst, and a rod extending interiorly of and along said second tube section and having one end pivoted to the other arm of said bellcrank, means operable adjacent said ocular for translating said rod, and an operative connection within said second section for effecting pivotal movement of said reflector in response to translation of said part, whereby said reflector may be pivoted from a position adjacent said ocular.

GEORGE RATTRAY.

REFERENCES CITED

The following references are of record in the file of this patent:

UNITED STATES PATENTS

| Number | Name | Date |
| --- | --- | --- |
| 784,852 | Goerz | Mar. 14, 1905 |
| 1,360,735 | Mazuel | Nov. 30, 1920 |
| 1,460,627 | Weaver | July 3, 1923 |
| 1,479,036 | Fosdick | Jan. 1, 1924 |
| 2,184,615 | Gunther | Dec. 26, 1939 |
| 2,266,741 | Crane et al. | Dec. 23, 1941 |
| 2,335,286 | Klemperer et al. | Nov. 30, 1943 |
| 2,366,410 | Klemperer et al. | Jan. 2, 1945 |

FOREIGN PATENTS

| Number | Country | Date |
| --- | --- | --- |
| 303,365 | Germany | Oct. 18, 1921 |
| 282,085 | Great Britain | Feb. 14, 1929 |
| 282,837 | Italy | Feb. 23, 1931 |